United States Patent [19]
Wydra

[11] Patent Number: 5,141,697
[45] Date of Patent: Aug. 25, 1992

[54] METHOD OF MAKING A SEGMENTED POLYMER ENERGY ABSORPTION DEVICE

[75] Inventor: Neal E. Wydra, Glen Ellyn, Ill.

[73] Assignee: Miner Enterprises, Inc., Geneva, Ill.

[21] Appl. No.: 693,185

[22] Filed: Apr. 29, 1991

[51] Int. Cl.$^5$ .............................................. B29C 53/30
[52] U.S. Cl. ............................ 264/320; 264/DIG. 41; 425/DIG. 27
[58] Field of Search ....... 264/320, 286, 322, DIG. 41, 264/DIG. 52; 425/392, 393, DIG. 127

[56] References Cited

U.S. PATENT DOCUMENTS

| | | |
|---|---|---|
| T100,801 | 7/1981 | Bianca . |
| 2,347,101 | 4/1944 | Harding ...................... 264/DIG. 52 |
| 3,339,004 | 8/1967 | Nardone .............................. 264/320 |
| 4,198,037 | 4/1980 | Anderson ............................ 264/325 |
| 4,566,678 | 1/1986 | Anderson ............................ 264/249 |
| 4,900,503 | 2/1990 | Hegler et al. ....................... 425/393 |
| 5,000,215 | 3/1991 | Phillips .................................. 137/15 |

Primary Examiner—James Lowe

[57] ABSTRACT

A method of producing segmented hollow body devices and the resulting products. The segmentation is accomplished by providing areas of increased cross-section around the circumference of the preform followed by axial compression thereof. These steps are followed by removal of the axial force resulting in a product which is segmented in accordance with the areas of increased cross-section and has a reduced free height.

4 Claims, 1 Drawing Sheet

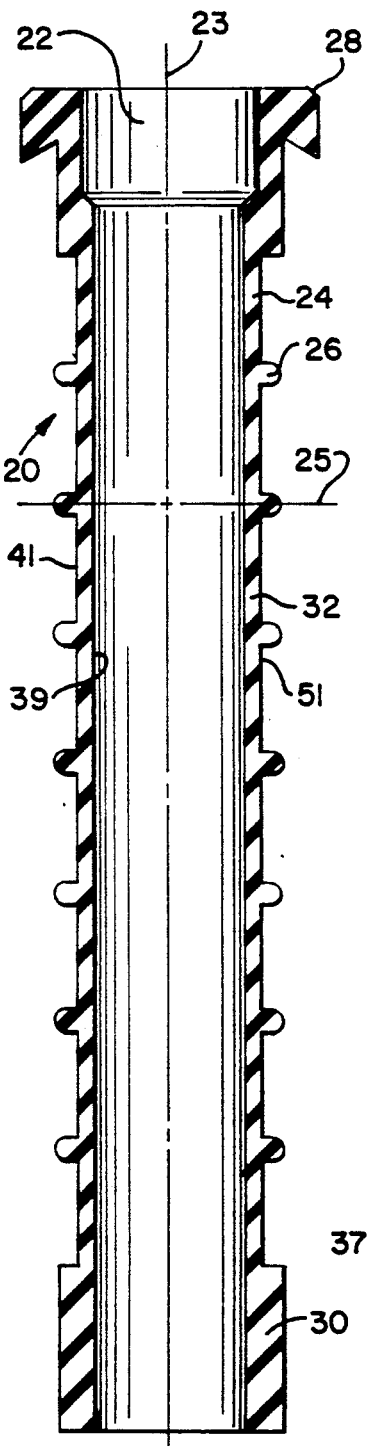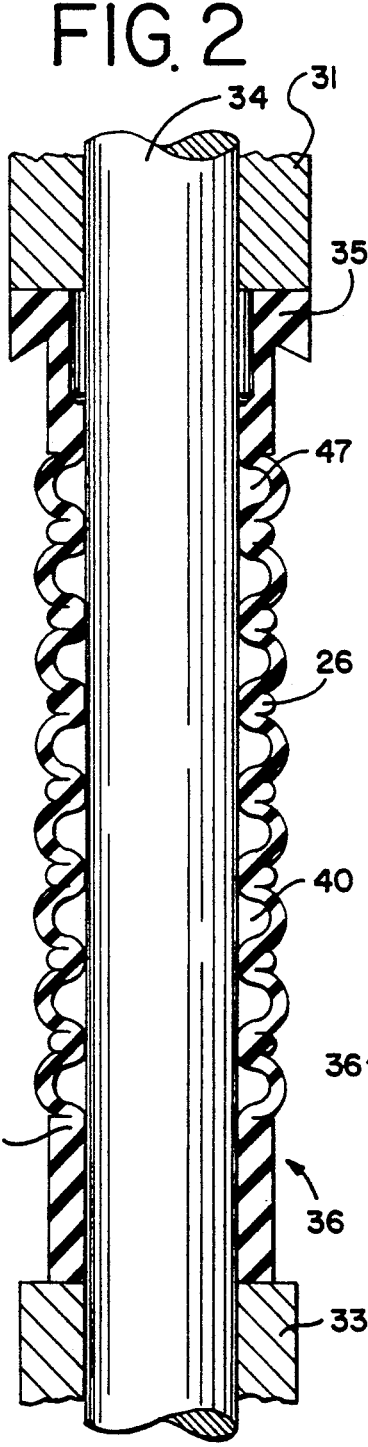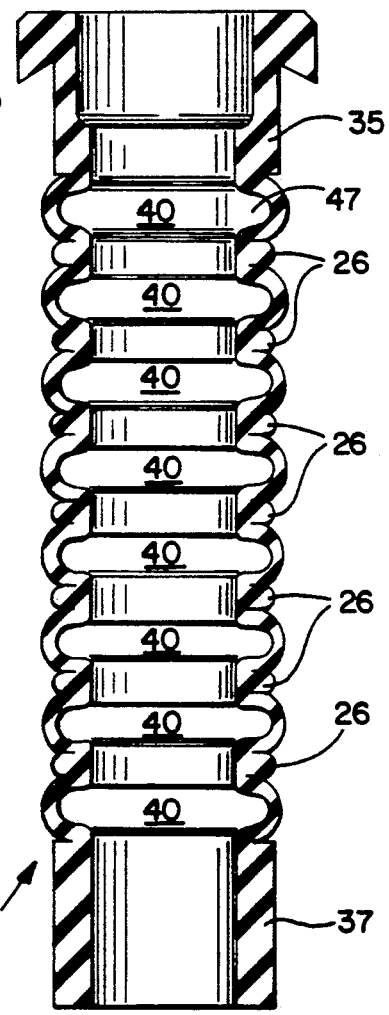

METHOD OF MAKING A SEGMENTED POLYMER ENERGY ABSORPTION DEVICE

This invention relates generally to a new hollow body device and to an improved method of making, more particularly it relates to a segmented hollow body device and to tis manufacture from copolyester polymer elastomer material.

BACKGROUND AND SUMMARY OF THE INVENTION

As discussed in U.S. Pat. Nos. 4,198,037 and 4,566,678 to David Anderson and assigned to the assignee of the present application, and Defensive Publication Number 190960 to Dominic Bianca and assigned to E. I. du Pont de Neumours & Co., thermoplastic elastomers have been widely used for the manufacture of compression springs. The thermoplastic elastomer discussed in these references is a copolyester polymer elastomer such as sold by E. I. du Pont de Nemours & Co. of Wilmington, Del., under the Trademark "HYTREL".

Generally, this type of polymer elastomer material has inherent physical properties that make it unsuitable for use as a compression spring. However, as noted in the above cited references, a method is set forth whereby copolyester polymer elastomer material can be treated for rendering the material usable for the manufacture of a compression spring.

This invention continues with the experimentation and development of physical modification of the elastomer block before the application of a compressive force as set forth in the above noted references. An objective is to tailor the shape of the starting material in order to produce a spring having a given spring rate. For example, when designing an elastomer spring, it is often necessary to incorporate a number of serially arranged subsidiary spring elements to satisfy the desired spring characteristics, all within a predefined envelope or space. This serial arrangement requires some method of segmenting or separating the subsidiary spring elements within the envelope.

Previous methods have generally relied on separate parts, such as steel plates, to either physically separate or segment the required subsidiary spring elements. These methods generally include a number of inherent disadvantages. First, the necessity and expense of the segmentation or seperation elements themselves. Second, the added complication and expense of assembling the various parts. The Bianca reference achieves spring rate modifications by securing steel disks around a "HYTREL" block followed by compression. The result is a segmented column spring wherein each segment is separated by a steel disk. The Anderson U.S. Pat. No. 4,566,678 provides a central core or opening in an individual copolyester elastomer body, before the application of an axial compressive force to achieve variations in spring characteristics. The individual subsidiary spring elements are then stacked to comprise a segmented column for use as a spring.

The invention hereunder consideration is directed to a segmented or separate energy-absorbing unit, formed from a single elastomer block. The current design overcomes the above noted disadvantages by using the elastomer itself to accomplish the segmentation of the spring into its subsidiary spring elements. By increasing the cross-sectional area of an elastomer tube at the desired segmentation locations, the initial structure of the tube or perform may be configured such that when subjected to axial compression a number of distinct subsidiary spring elements will be created between the segmentation locations. The extra elastomeric material located at the segmentation points serves to constrain the elastomer during axial compression and greatly reduce the deformation, both axially and radially, at these locations. Neither additional parts nor assembly are required. The segmentation of the single elastomer block into a series of subsidiary spring elements is achieved without the aid of steel retaining rings or other external means. In practice, a hollow elastomer tube is manufactured which includes ring or donut portions (of additional cross-sectional area) encircling the tube at the points of desired segmentation. The block or tube is then subjected to axial compressive forces as described in the above identified U.S. Patents to Anderson, the disclosures of which are incorporated herein by reference. As is apparent, the resultant product is a single unitary member through which fluid may pass without the problem of leakage through the side walls. Thus, it may function additionally as a subassembly in a seal or accumulator.

DESCRIPTION OF THE DRAWINGS

Further advantages and features of the present invention will become more apparent from a description of several embodiments thereof taken in conjunction with the accompanying drawings in which:

FIG. 1 is a front cross-sectional elevational view of the elastomer body or tube illustrating a central axial core opening and the encircling ring or donut portions prior to the application of an axial compressive force;

FIG. 2 is a cross-sectional front elevational view of the elastomer tube shown in FIG. 1 depicted in the process of having an axial compressive force applied to the body; and FIG. 3 is a cross-sectional elevational view of the modified hollow body shown in FIG. 2 after the application and removal of a compressive force to the body.

DESCRIPTION OF SPECIFIC EMBODIMENT

The method of producing improved elastomer bodies pursuant to this invention will be described by reference to the drawings identified as FIGS. 1-3. Shown therein is a perform which in this example is a hollow cylindrical block 20 of copolyester polymer elastomer manufactured to predetermined physical dimensions to achieve the desired spring rate in the final product. The block 20, in the preferred embodiment, is a tube, and includes: an initial central core opening 22 which extends axially therethrough; wall sections such as 24; separated bands of increased cross-sectional area or ribbed portions such as 26; top and bottom portion 28 and 30 also of increased cross-sectional area; and inner 39 and outer 41 surfaces. As used herein, the term "increased cross-sectional area" refers to a portion of the preform which has a thicker wall section than the rest of the structure. The single block 20 has a preselected initial axial length, a major axis 23 extending parallel with said axial length and a transverse shape. The bands of increased cross-sectional area 26 also have a major axis, such as 25, which is perpendicular to the major axis 23 of the block 20. The block 20, in accordance with the desired objective, can be manufactured by machining, molding or other suitable methods. The number and location of the ribbed portions 26, the extent of the core opening 22, the thickness of the wall 32, are all factors which influence the spring rate of the ultimate product.

In practice, a single block, preferably in the form of a tube, having a preselected initial axial length, a trasverse shape, an initial core opening extending axially through with bands of increased cross-sectional area at predetermined locations, is subjected to axial compression. The degree of compression may vary but must be at least 30% of the initial axial length whereby the material will permanently retain a substantial portion of the length reduction after being compressed. The application of an axial force, such as by blocks 31 and 33, is sufficient to transform the transverse shape of the tube, such that the single core 22 opening is changed into a series of hollow bodies, such as 47, of a preselected configuration and spring rate. As is apparent, one the axial force is removed, the new hollow bodies, such as 47, are bounded by bands or areas of increased cross-section, either ribbed portions 26 or ends 35 and 37. The hollow elastomer body is compressed around, for example, a mandrel 34 to achieve the desired spring characteristics. The product of the above-described application of force to the block 20 shown in FIG. 1 is the multi-segmented hollow elastomer body 36 shown in FIGS. 2 and 3. The compression of the block 20 not only changes the physical characteristics of the polymer material, but it transversely and outwardly expands the individual core sections 22 to produce the series of generally toroidally-shaped hollow portions 47 or subsidiary spring elements, each having similar enlarged symmetrical cores 40, as well as properties. The size or strength of the ribbed portions 26 needed to effect segmentation is determined by such factors as the wall 32 thickness, and the diameter of the center core opening 22. Additionally, the location of the ribs or bands along the major axis of the tube determines where segmentation will occur, which in turn dictates the spring rate of the subsidiary spring elements and the final product. In practice, the bands are equally spaced from each other along the length of the tube and thus produce segmented spring sections which are generally the same in spring rate. As stated, the size of the ribbed portion 26 must be such that it possesses sufficient strength to cause the segmentation of the cylindrical block 20 and thus, will vary from block to block. In practice the ribbed portion 26 passes all the way around the outer surface of circumference of the block 20. However, it may be possible to achieve segmentation through the use of a series of ribbed portion bits (not shown) extending around the outer circumference of the block 20. It should be appreciated that each segmented section 47 can be considered a separate energy absorbing unit while being part of a single unitary block of tube. As discussed, the use of steel plates creates a degree of uncertainty when predicting the spring rate of the device manufactured. Specifically, the surface finish of the steel plates effects the spring rate of the device. The rougher the surface finish, the stronger the surface grips the elastomer as it is pressed down against the surface and the higher the spring rate. Thus, the spring rate can vary from segmented unit to segmented unit, as well as from energy-absorbing device to energy-absorbing device. In commercial practice, steel plates are rigorously quality controlled to ensure that the surface finish is consistent over time. A further factor to be considered, assuming the surface is acceptable, is that a steel plate is a poor compression spring.

The ribbed portions 26 suffer from neither of these short comings. The quality of the base copolyester polymer elastomer material can be closely controlled and so will not vary significantly from batch to batch. Further, the entire hollow cylindrical block 20 is manufactured essentially at the same time and all of the same material. Therefore, the coefficient of friction is predictable for all elements and remains the same over time. Additionally, the ribbed portions 26, as a result of the forming process, are capable of functioning as compressions springs. Thus, in a given envelope, a compression spring made in accordance with this invention will generally have a greater ability to absorb energy than one manufactured in accordance with Bianca or the above identified Anderson Patents. There is simply more elastomer material to absorb energy.

The use of steel plates also requires strict quality control in their placement with respect to the elastomer body. A different spring rate will result if the steel plate is not centered with an Anderson device, or if exact vertical spacing is not maintained in Bianca. There is little chance for error when the preform or cylindrical block 20 is molded or machined.

The various embodiments of the invention are set forth above by way of example. It will be appreciated by those skilled in the art that modifications can be made to the method and apparatus of this invention without departing from the spirit and scope of the invention as set forth in the accompanying claims.

What is claimed is:

1. A method of producing a segmented energy absorption device from a copolyester polymer elastomer material comprising the steps of:
    providing a single block of said copolyester polymer elastomer having a preselected initial axial length, a transverse shape, an initial core opening extending axially through said block and bands of increased cross section area at predetermined locations, said material being such that upon being axially compressed at least 30% of said initial axial length the material will permanently retain a substantial portion of the length reduction after being compressed;
    applying to said block having said bands of increased cross section area an axial force sufficient to compress said block at least 30% of its initial axial length to change the transverse shape of said block such that it takes a set and the configuration of said core opening is changed to a series of hollow bodies of a preselected configuration; and
    removing said axial force from said block.

2. The method of producing a segmented energy absorption device employing the method of claim 1 wherein said block is a tube having a major axis extending the length thereof and said bands of increased cross section area have major axis which are perpendicular to the major axis of said tube.

3. A method of making a compressions spring member comprising the steps of:
    providing a tube of thermoplastic elastomer material having a selected initial axial length, a major axis, an initial core opening and bands of increased cross sectional area having an axis located generally perpendicular to said major axis, said bands of increased cross section are ribbed means which extend the circumference of said outer surface of said tube, said material being such that upon being axially compressed at least 30% of said initial axial length the material will permanently retain a substantial portion of the length reduction induced by compression;

applying an axial force sufficient to compress said tube having said bands of increased cross sectional area, at least 30% of its initial axial length to change the initial core opening into a series of permanently expended transversely outwardly core openings bounded by bands of increased cross sectional areas to thereby provide a segmented hollow body compression spring; and removing said axial force from said block which has taken a permanent set.

4. A method in accordance with claim 3 wherein said ribbed means are spaced generally equally distance apart along said major axis.

* * * * *